(12) United States Patent
Breivik et al.

(10) Patent No.: US 7,601,310 B2
(45) Date of Patent: Oct. 13, 2009

(54) DISTRIBUTOR SYSTEM FOR DOWNFLOW REACTORS

(75) Inventors: Rasmus Breivik, Hillerød (DK); Johan Mogensen, Gentofte (DK); Torkil Ottesen Hansen, Copenhagen Ø (DK)

(73) Assignee: Haldor Topsoe A/S, Lyngby (DK)

( * ) Notice: Subject to any disclaimer, the term of this patent is extended or adjusted under 35 U.S.C. 154(b) by 443 days.

(21) Appl. No.: 11/430,089

(22) Filed: May 9, 2006

(65) Prior Publication Data

US 2006/0257300 A1    Nov. 16, 2006

(30) Foreign Application Priority Data

May 13, 2005   (DK) ............................... 2005 00699

(51) Int. Cl.
*B01J 8/04*    (2006.01)

(52) U.S. Cl. .................. 422/190; 422/191; 422/194; 422/195; 422/224

(58) Field of Classification Search ................ 422/190, 422/191, 194, 195, 224; 239/558; 261/179
See application file for complete search history.

(56) References Cited

U.S. PATENT DOCUMENTS

| | | | |
|---|---|---|---|
| 2,705,136 A | | 3/1955 | Glitsch |
| 2,797,907 A | | 7/1957 | De Bie |
| 4,192,835 A | | 3/1980 | Powers |
| 4,836,989 A | * | 6/1989 | Aly et al. .................... 422/195 |
| 5,462,719 A | * | 10/1995 | Pedersen et al. ............ 422/195 |
| 5,690,896 A | * | 11/1997 | Stangeland et al. ......... 422/191 |
| 5,942,162 A | | 8/1999 | Gamborg et al. |
| 6,183,702 B1 | * | 2/2001 | Nguyen et al. .............. 422/194 |
| 7,045,103 B2 | * | 5/2006 | McDougald et al. ........ 422/191 |
| 7,070,745 B2 | * | 7/2006 | Van Der Meer et al. ..... 422/194 |
| 7,078,002 B2 | * | 7/2006 | Van Vliet et al. ............ 422/195 |
| 7,452,516 B2 | * | 11/2008 | Van Hasselt et al. ........ 422/311 |

FOREIGN PATENT DOCUMENTS

| | | |
|---|---|---|
| DE | 739 358 C | 9/1943 |
| DE | 39 39 267 A1 | 5/1991 |
| EP | 1 437 175 A2 | 7/2004 |
| EP | 14772221 * | 11/2004 |
| WO | WO 02/085504 A1 | 10/2002 |

* cited by examiner

*Primary Examiner*—N. Bhat
(74) *Attorney, Agent, or Firm*—Dickstein Shapiro LLP

(57) ABSTRACT

Downflow catalytic reactor having a plurality of catalyst beds in which a mixture of gas and liquid are passed, the region in between subsequent catalyst beds being provided with a distributor system for the distribution and mixing of gas and liquid prior to contact with a subsequent catalyst bed, said region comprising:

(a) gas injection line arranged below a catalyst support tray,
(b) collector tray adapted to receive gas and liquid,
(c) spillway collectors extending above the level of said collecting tray,
(d) mixing chamber adapted to receive the gas and liquid descending from said spillway collectors,
(e) impingement plate below said mixing chamber,
(f) first distributor tray arranged below said impingement plate having a number of apertures throughout and a number chimneys, and
(g) second distributor tray arranged below said first distributor tray for the redistribution of gas and liquid prior to contact with the subsequent catalyst bed, wherein the at least one chimney is provided with a distributor device that is able to divide the chimney chamber into at least two chambers.

8 Claims, 2 Drawing Sheets

DISTRIBUTOR SYSTEM FOR DOWNFLOW REACTORS

BACKGROUND OF THE INVENTION

This invention relates to a distributor device for improving the distribution and mixing of gas and liquid in the region between catalyst beds in downflow catalytic reactors comprising a plurality of said beds. More particularly, the invention relates to a distributor device for improving the distribution and mixing of gas and liquid entering the final distributor plate above the top of a succeeding catalyst bed. The distributor device is particularly suitable for catalytic reactors in which gas-liquid mixtures are passed through beds of solid catalyst particles, particularly for downflow catalytic reactors used for hydrotreating and hydrocracking in oil refining operations.

In downflow reactors it is necessary that gas and liquid are properly mixed across the horizontal cross section of the reactor prior to entering the catalyst beds. A plurality of catalyst beds is arranged within the reactor and a distributor system for the proper mixing of gas and liquids is arranged in the region between two subsequent catalyst beds. This region is normally provided with a gas injection line underneath a catalyst bed, whereby additional gas is injected to compensate for the gas already been consumed in the previous catalyst bed or as a quench gas, for instance by injection of hydrogen. The liquid falling downward from the above-lying catalyst bed is allowed to accumulate by means of a plurality of spillways located in a collector tray and positioned below or above the level of the gas injection line. After reaching a certain level, the liquid passes through the spillways into a mixing chamber where a swirling movement of the liquid is provided. This enables good mixing of the liquid and thereby even temperature conditions of the liquid. The liquid from the mixed chamber falls downward onto a deflector or impingement plate, whereby the flow is redirected onto a first distributor tray having a large number of downflow openings for the passage of liquid. In this tray a rough distribution of the gas and liquid across the reactor is effected. A pool of liquid accumulates in this tray and covers the openings so that the passage of gas is precluded. The passage of gas from said first distributor tray is enabled by the provision of a number of chimneys. The two phases are then mixed downstream in a second or final distributor tray having a number of tubular downcomers for the flow of gas and liquid. This tray is dedicated to redistribute the gas and liquid substantially symmetrically across the horizontal cross section of the reactor over the top of the subsequent catalyst bed.

In order to improve the uniformity of distribution and mixing of vapour and liquid across the reactor U.S. Pat. No. 4,836,989 describes a distributor system in the region between catalyst beds as described above, in which the outlets of the spillways are adapted to impart a swirling motion to the liquid as this enters the mixing chamber. Each of the chimneys for the downward passage of vapour connected to the first distributor tray comprises an open-topped tube extending above said first distributor tray and includes an apertured plate at its lower end. The high velocity and swirling motion prevailing in the mixing chamber manifests itself in the chimneys downstream and as a result the flow leaving the chimney will experience a greater flow velocity towards the reactor wall than towards the center of the reactor. Accordingly, the downward flow from the chimneys is unevenly distributed in the second (final) distributor tray, with the attendant effect that the gas and liquid are not optimally mixed across the horizontal cross section of the reactor when contacting the underlying catalyst bed.

SUMMARY OF THE INVENTION

It is therefore an objective of the invention to provide an improved uniformity across the horizontal cross section of a reactor in the flow descending from the chimneys and improved mixing of the gas and liquid entering the second distributor tray prior to contact with the subsequent catalyst bed.

It is another object of the invention to be able to provide for such improved uniformity in the flow and mixing of the gas and liquid while at the same time keeping intact the swirling motion effected in the mixing chamber above the chimneys.

Hence, according to the invention we provide a downflow catalytic reactor having a plurality of catalyst beds in which a mixture of gas and liquid are passed, the region in between subsequent catalyst beds being provided with a distributor system for the distribution and mixing of gas and liquid prior to contact with a subsequent catalyst bed, said distributor system comprising:

(a) gas injection line arranged below a catalyst support tray,
(b) collector tray arranged below said gas injection line and adapted to receive gas and liquid,
(c) spillway collectors extending above the level of said collector tray and provided with outlet openings for the passage of gas and liquid, said outlet openings being adapted to impart swirling motion to the exiting gas and liquid,
(d) mixing chamber adapted to receive and maintain a swirling motion to the gas and liquid descending from said spillway collectors,
(e) impingement plate below said mixing chamber adapted to direct the flow in radial direction from said mixing chamber,
(f) first distributor tray arranged below said impingement plate having a number of apertures throughout to allow for the downward passage of liquid and a number of chimneys to allow for the downward passage of gas, and
(g) second distributor tray arranged below said first distributor tray, said second distributor tray having a number of elongated tubes, in which said elongated tubes provide for the redistribution of gas and liquid prior to contact with the subsequent catalyst bed, wherein the at least one chimney is provided with a distributor device that is able to divide the chimney chamber into at least two chambers.

Thus, by simple means the rotary motion of the fluid inside the chimney is disrupted, whereby the velocity profile of the downward flow from the chimneys is equalized and the flow is evenly distributed across the horizontal cross section of the reactor.

Preferably the distributor device is formed by a plate so as to divide the chimney chamber into at least two substantially equal chambers. More preferably, the distributor device is formed by two plates crossing each other so as to divide the chimney chamber into four substantially equal chambers. The distributor device is simple and thus easy to fabricate and install inside the chimneys. By dividing the chimney into four separate chambers the disruption of the swirling motion is better effected. Other configurations are obviously also possible, for instance the chambers may differs in size and the distributor device may be formed so as to divide the chimney chamber into six or even more separate chambers. Because of the penalty in terms of pressure drop as the number of separate chambers increase, it is preferred that the chimney is divided into four chambers. Preferably the chambers are of substantially equal size. The plates are preferably solid metal plates which may also be provided with orifices or apertures to enable exchange of fluids in between chambers and reduce pressure drop.

The distributor device extends upwardly from the bottom of the chimney up to above 25% of the length of the chimney, preferably up to 50% of the length of the chimney. The level of the bottom of the at least one chimney may correspond to the level of the first distributor tray providing for the rough distribution of gas and liquid, but the chimneys may also extend below the level of the first distributor tray.

In the downflow catalytic reactor according to the invention the at least one chimney, preferably all chimneys are provided with a closed top with separate side apertures for separate entry of liquid and gas, wherein the apertures for gas flow face away from the orifice hole of the mixing chamber. This enables that the liquid falling from the mix chamber is precluded from bypassing directly onto the final or second tray above the subsequent catalyst bed due to direct inflow through the chimneys. The bypass of liquid from the mixing chamber may result in very low liquid level on the first distributor tray, thereby increasing the risk of transferring the pressure gradient from above said first distributor tray to the second distributor tray downstream.

The chimneys are normally located in a circle around the center of the reactor, in which the distance from the center of the reactor corresponds to about half the radius of the reactor. The main purpose of locating the chimneys in a circle or ring around the center of the reactor is to ensure that any pressure gradient developed on the first distributor tray is not transferred to the second distributor tray. Preferably, the chimneys are located around the center of the reactor, in which the distance from the center of the reactor to any of the chimneys corresponds to about 25% to 75%, 85% or 90% of the radius of the reactor. The radius of the reactor as used herein corresponds to the distance from the center of the reactor, roughly given by the position of the orifice hole of the mixing chamber for the exit of fluid, to the inner wall of the reactor.

The distributor system in the region between subsequent catalyst beds may also comprise a perforated plate arranged below the first distributor tray which covers substantially the whole cross section of the second distributor tray arranged below. This enables further distribution of the downcoming flow from the chimneys and first distributor tray prior to entering the second and final tray and at the same time creates a calm fluid surface on the second (final) distributor tray. Preferably, said perforated plate in the region of the plate just underneath the at least one chimney is absent of any openings. This enables improved distribution of the liquid descending from the chimneys onto the second distributor tray and disruption of direct inflow gas and liquid into the elongated tubes of the second tray.

In another embodiment of the invention a horizontal plate of substantially the same diameter as the outer diameter of the at least one chimney is positioned below said chimney and above the perforated plate covering the second distributor tray.

In yet another embodiment of the invention the perforated plate is omitted and a horizontal plate of substantially the same diameter as the outer diameter of the at least one chimney is positioned below said chimney and above the second distributor tray.

Said substantially horizontal plate may be supported on adjacent elongated tubes of the second distributor tray, for example the horizontal plate may be supported by vertical arms protruding downwards onto the top of adjacent elongated tubes of the second distributor tray. This enables also the improved distribution of the liquid descending from the chimneys onto the second distributor tray and impedes the direct inflow of fluid from the chimneys onto the elongated tubes immediately underneath in the second distributor tray. The substantially horizontal plate may accommodate other forms which also are suitable for improving the mixing, the plate may for example bend downwards at its ends.

An attendant benefit of the invention is that it is now possible to reduce the distance between the bottom level of the chimneys and the second (final) tray, thus enabling the provision of a more compact reactor design.

The invention is also suitable for the revamping or retrofitting of existing quench sections in downflow reactors, whereby the chimneys of the distributor system may expediently be provided with the distributor device by simply inserting and fixing the inventive device into the at least one chimney. This can be done rapidly and efficiently thereby reducing costly down-time in the reactor operation.

The region in between subsequent catalyst beds is alternatively referred in this specification as quench section. The term fluid encompasses a gas or a liquid or a mixture of both. The terms gas and vapour are used interchangeably, as also are the terms gas injection line and quench ring. The elongated tubes in the second (final) tray as used in this specification are also referred as vapour lift tubes.

BRIEF DESCRIPTION OF THE DRAWINGS

The invention is further described by the accompanying drawings in which.

DETAILED DESCRIPTION OF THE PREFERRED EMBODIMENTS

Figure 1:
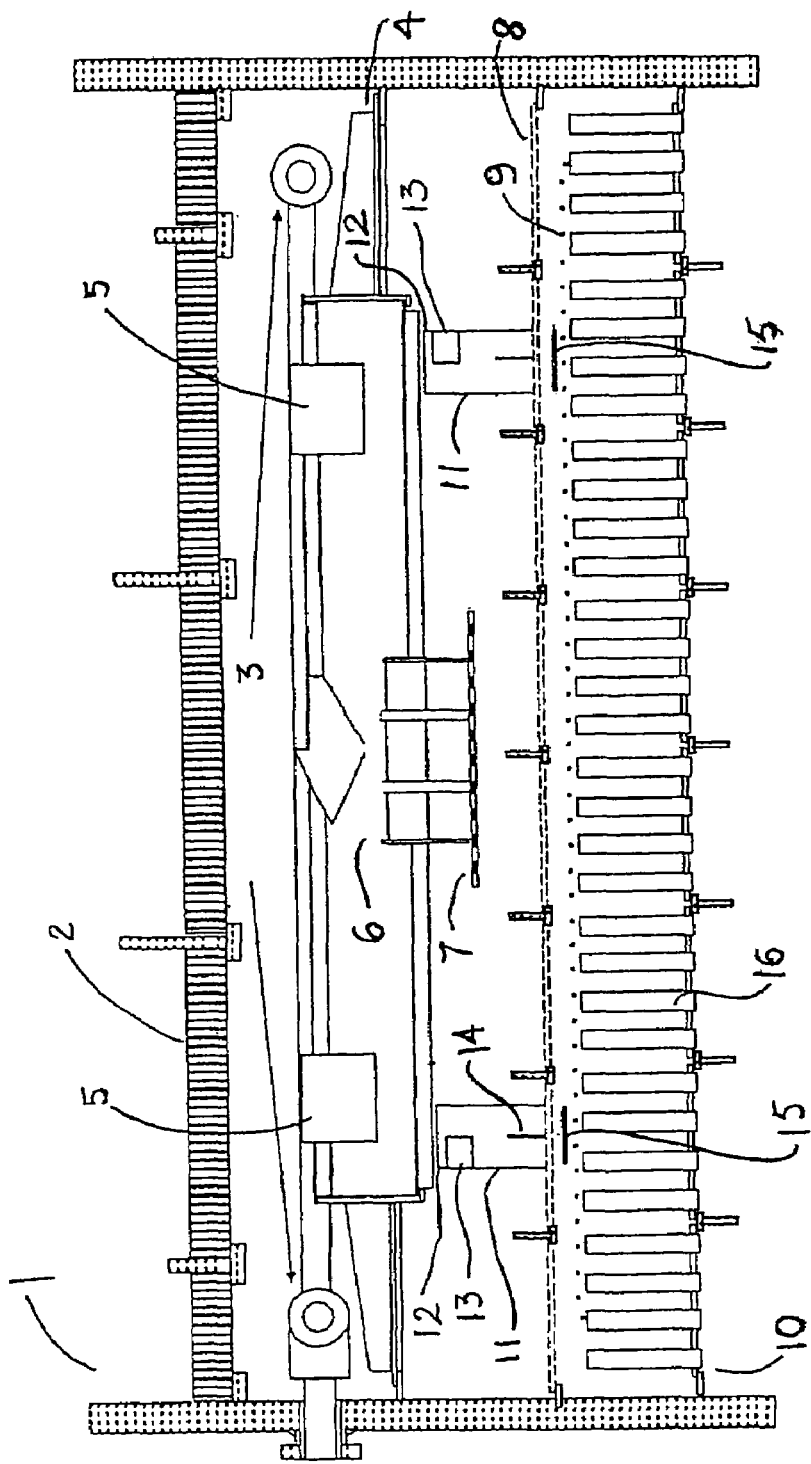
FIG. 1 is a vertical section of the quench section of a downflow reactor according to the invention.

Referring to FIG. 1, the downflow reactor 1 comprises a quench section below a catalyst tray 2 having a quench ring 3 for injection of quench gas, normally hydrogen, collector tray 4 arranged below said quench ring, spillways 5, vortex mixing chamber 6, impingement plate 7, first distributor tray 8, perforated plate 9, and a second or final tray 10 in the form of a vapour lift tube (VLT) redistribution tray.

A pool of liquid accumulates in collector tray 4 and is transferred to spillways 5, which are provided with outlets that impart a rotary movement to the exiting fluid. The vortex mixing chamber 6 mixes the reactant fluids in a compartment where the fluids are swirled together. The fluids exit the mixing chamber 6 by overflow in a weir and pass through a central orifice at the bottom. The fluids then drop onto the impingement plate 7, which redirects the flow radially underneath the mixing chamber 6. The impingement plate 7 is located at a distance above the first distributor tray to provide free flow of liquid underneath.

The fluids then drop down on the first distributor plate 8, which serves as a rough distributor for the separation of the fluid into gas and liquid. This first distributor tray 8 is equipped with a large number of apertures for the distribution of liquid across the cross section of the VLT tray 10 below. The first distributor plate 8 has a plurality of chimneys 11 located in a circle around the center of the reactor. Each chimney comprises a closed top 12 with side aperture 13 for separate entry of liquid and gas. The side apertures 13 can be holes graded in size with the largest holes for liquid overflow located at the same height as the impingement plate 7. The apertures 13 in the chimneys 11 for gas flow are designed to be facing away from the mixer orifice hole for the exit of fluid in order to eliminate liquid bypassed directly onto the vapour lift tray 10.

A dedicated distributor device 14 located inside each chimney acts as a swirl breaker. The distributor device extends upwardly from the bottom of the chimney up to about 25% of the length of the chimney, preferably up to 50% of the length of the chimney. The level of the bottom of the at least one chimney corresponds to the level of the first distributor tray providing for the rough distribution of gas and liquid, but the chimneys may also extend below the level of the first distributor tray. The flow of fluid from the chimneys 11 and first distributor plate 8 drops through a perforated plate 9 covering most of the VLT tray 10. The perforate plate 9 may advantageously be non-perforated (absent of any openings) in the region of plate 9 just underneath the chimneys 11. This region corresponds substantially to the cross sectional area of the chimney. Alternatively substantially horizontal plates 15 may be provided in between the chimneys 11 and VLT tray 10 to further distribute the fluid and impede direct inflow into elongated tubes 16 of vapour lift tray 10. The VLT tray 10 is a vapour assisted type tray comprising a large number of vapour-liquid downcomers in the form of such elongated tubes 16, which redistribute the liquid and vapour over the top of the succeeding catalyst bed (not shown).

Figure 2:
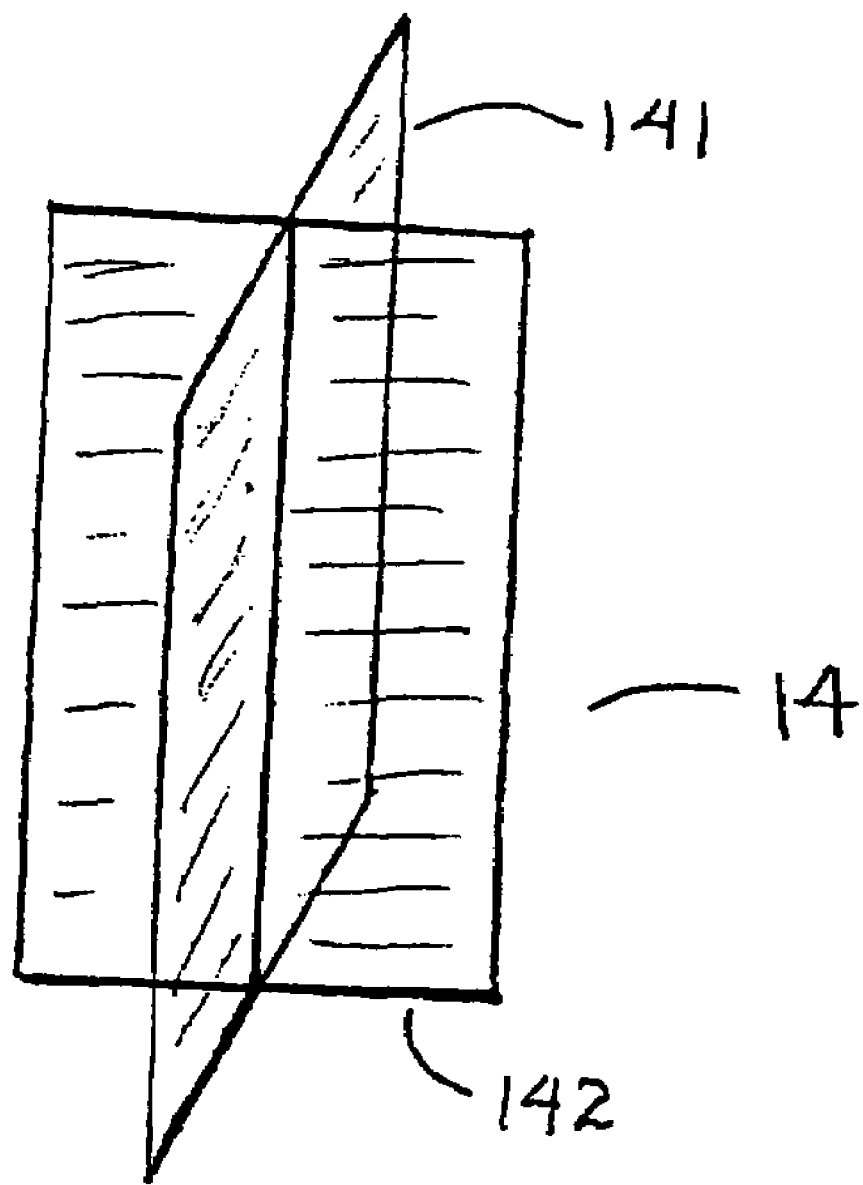
FIG. 2 is a schematic of a particular embodiment of the distributor device according to the invention.

Referring now to FIG. 2 in this particular embodiment, the distributor device 14 is formed by two plates 141, 142 crossing each other so as to divide the chimney chamber into four substantially equal chambers. The plates are preferably solid metal plates which may also be provided with orifices to enable exchange of fluids in between chambers and reduce pressure drop.

What is claimed is:

1. Downflow catalytic reactor having a plurality of catalyst beds in which a mixture of gas and liquid are passed, the region in between subsequent catalyst beds being provided with a distributor system for the distribution and mixing of gas and liquid prior to contact with a subsequent catalyst bed, said region comprising:
   (a) gas injection line arranged below a catalyst support tray,
   (b) collector tray adapted to receive gas and liquid,
   (c) spillway collectors extending above the level of said collecting tray and provided with outlet openings for the passage of gas and liquid, said outlet openings being adapted to impart swirling motion to the exiting gas and liquid,
   (d) mixing chamber adapted to receive and maintain a swirling motion to the gas and liquid descending from said spillway collectors,
   (e) impingement plate below said mixing chamber adapted to direct the flow in radial direction from said mixing chamber,
   (f) first distributor tray arranged below said impingement plate having a number of apertures throughout to allow for the downward passage of liquid and a number of chimneys to allow for the downward passage of gas, and
   (g) second distributor tray arranged below said first distributor tray, said second distributor tray having a number of elongated tubes, in which said elongated tubes provide for the redistribution of gas and liquid prior to contact with the subsequent catalyst bed, wherein the at least one chimney is provided with a distributor device that is able to divide the chimney chamber into at least two chambers.

2. Downflow catalytic reactor according to claim 1, wherein said distributor device is formed by two plates crossing each other so as to divide the chimney chamber into four substantially equal chambers.

3. Downflow catalytic reactor according to claim 1, in which the at least one chimney is provided with a closed top with separate side apertures for separate entry of liquid and gas, wherein the apertures for gas flow face away from the orifice hole of the mixing chamber.

4. Downflow catalytic reactor according to claim 1, further comprising a perforated plate arranged below said first distributor tray and covering substantially the whole cross section of the second distributor tray arranged below.

5. Downflow catalytic reactor according to claim 4, wherein a substantially horizontal plate of substantially the same diameter as the outer diameter of the at least one chimney is positioned below said chimney and above the perforated plate covering the second distributor tray.

6. Downflow catalytic reactor according to claim 4, wherein said perforated plate in the region just underneath the at least one chimney is absent of any openings.

7. Downflow catalytic reactor according to claim 4, wherein said substantially horizontal plate is supported on adjacent elongated tubes of the second distributor tray.

8. Downflow catalytic reactor according to claim 1, wherein the chimneys are located around the center of the reactor so that the distance from the center of the reactor to any of the chimneys corresponds to about 25% to 75%, 85% or 90% of the radius of the reactor.

* * * * *

UNITED STATES PATENT AND TRADEMARK OFFICE
CERTIFICATE OF CORRECTION

PATENT NO.       : 7,601,310 B2                               Page 1 of 1
APPLICATION NO. : 11/430089
DATED            : October 13, 2009
INVENTOR(S)      : Breivik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 600 days.

Signed and Sealed this

Fifth Day of October, 2010

David J. Kappos
*Director of the United States Patent and Trademark Office*